United States Patent Office
3,554,947
Patented Jan. 12, 1971

3,554,947
METHOD OF PREVENTING AGGLOMERATION OF POWDERED UREA-FORMALDEHYDE RESINS
Iwao Maruta, Funabashi-shi, and Akihiko Iida, Chiba-shi, Japan, assignors to Kao Soap Co., Ltd., Nihonbashi-Bakurocho, Chuo-ku, Tokyo, Japan
No Drawing. Filed Sept. 30, 1968, Ser. No. 763,907
Claims priority, application Japan, Oct. 4, 1967, 42/63,927
The portion of the term of the patent subsequent to June 18, 1985, has been disclaimed
Int. Cl. C09k 3/16
U.S. Cl. 260—21                                8 Claims

ABSTRACT OF THE DISCLOSURE

A method of preventing agglomeration of powdered urea-formaldehyde resins in which an antiagglomerating agent comprising a water-solubilized macromolecular vinylic compound and an anionic surface active agent is incorporated in the resin in an amount of between about 0.005 to 2% by weight of the resin powder.

BACKGROUND OF THE INVENTION

Field of the invention

This invention relates to a method of preventing agglomeration of powdered urea-formaldehyde resins.

Description of the prior art

The term "powdered urea-formaldehyde resins" used herein refers to (1) water-soluble or insoluble powdered urea-formaldehyde resins obtained through methylol urea and dimethylol urea by heating urea and formaldehyde under acid conditions and (2) a molding urea resin compound which is obtained by first preparing a resin solution containing monomethylol urea, dimethylol urea and other precondensates by heating urea and formalin under neutral or weakly alkaline conditions, mixing said resin solution with fillers such as pulp and a pigment or dye, followed by heating, drying and then crushing the mixture.

These powdered urea-formaldehyde resins have been used to make various molded articles and they are known as excellent molding materials. However, they are susceptible to becoming agglomerated during handling and storage so that the efficiency of the molding operation has been reduced. A solution to this problem has been desired for a long time.

As antiagglomerating agents, it is well known to use fine powdery inorganic substances such as kaolin, bentonite and calcium carbonate. However, depending on the end uses of the molded articles, it is often undesirable to add these antiagglomerating agents to powdered urea-formaldehyde resins. Further, they will give usually negative effects on the appearance, strength and electric properties of the molded products and therefore, it is sometimes impossible to use them.

SUMMARY OF THE INVENTION

We have studied methods for preventing the agglomeration of powdered urea-formaldehyde resins, as above mentioned, and have discovered that, if (1) a small amount of a water-solubilized solution of a substantially water-insoluble macromolecular vinylic campound dissolved in a concentrated aqueous solution (normally of a concentration of about 10–30% by weight) of an anionic surface active agent (which shall be referred to hereinafter as a water-solubilized macromolecular solution) as it is or as diluted with water to a concentration of about 1–10% by weight, is added to (2) a powdered urea-formaldehyde resin, an excellent antiagglomerating effect will be obtained. The properties of the molded articles will not be adversely influenced by the addition of said water-solubilized macromolecular solution.

As the above-mentioned substantially water-insoluble macromolecular vinylic compounds to be used in the present invention, there are exemplified polyvinyl acetals (which shall be abbreviated as PVAL hereinafter), polyvinyl acetates (which shall be abbreviated as PVAc hereinafter), water-insoluble partially saponified PVAc or water-insoluble partially acetylated polyvinyl alcohols, (polyvinyl alcohol shall be abbreviated as PVA hereinafter), water-insoluble polymers obtained by the graft-polymerization of vinyl acetate (which shall be abbreviated as VAc hereinafter) on PVA, water-insoluble copolymers of VAc with compounds copolymerizable with VAc, such as vinyl pyrrolidone and maleic anhydride, and copolymers of VAc with compounds, such as vinyl laurate, which will produce with VAc water-insoluble polymers.

However, it should be noted that, when a large amount of a compound, such as vinyl laurate, which will produce a polymer particularly insoluble in water is copolymerized with VAc, the copolymer will become too hard to be dissolved in an aqueous concentrated solution of an anionic surface active agent.

For PVAL, there is used PVA acetalized with lower aliphatic aldehydes such as formaldehyde, acetaldehyde and butylaldehyde.

The PVA to be used in the present invention need not be pure and acetic acid or the like may remain as ester-bonded in the molecule. Further, it may be obtained by hydrolyzing a copolymer of VAc and another polymerizable compound, for example, an unsaturated compound such as vinyl pyrrolidone, maleic anhydride or vinyl laurate.

As anionic surface active agents for dissolving water-insoluble macromolecular vinylic compounds, there can be used surface active agents having carboxyl groups such as sodium resinate (which shall be abbreviated as RS hereinafter) and sodium oleate (which shall be abbreviated as OS hereinafter) alkyl sulfates such as sodium dodecylsulfate (which shall be abbreviated as SDS hereinafter), alkylaryl sulfonates such as sodium butylnaphthalene-sulfonate (which shall be abbreviated as BNS hereinafter) and sodium dodecylbenzene sulfonate (which shall be abbreviated as DBS hereinafter) and alkyl sulfonates such as sodium dodecylsulfonate.

The weight ratio of the anionic surface active agent to the water-insoluble macromolecular compound in order to obtain a water-solubilized macromolecular solution is generally such that the surface active agent: macromolecular compound may be in the range of 100:10 to 10:100, by weight.

A typical process for preparing a water-solubilized macromolecular solution from an anionic surface active agent and a macromolecular vinylic compound is to add a predetermined amount of a granular maromolecular vinylic compound to a concentrated anionic surface active agent aqueous solution and to stir the mixture at room temperature or while heating it to a little higher temperature.

In carrying out the present invention, the antiagglomerant agent of the present invention is added to the urea-formaldehyde resin powders in such an amount that about 0.005 to 2% by weight, preferably, 0.05–0.5% by weight, of the water-solubilized macromolecular vinylic compound (sum of the macromolecular weight vinylic compound and the anionic surface active agent, calculated as solids) is present in the urea-formaldehyde resin powders.

The water-solubilized macromolecular solution can be diluted with water in any relative ratio. Therefore, it can be added, as it is or as diluted with water to a suitable concentration, to the urea-formaldehyde resin powders to be treated to obtain the desired workability of the resulting mixture.

For methods of applying the antiagglomerating agent of the present invention to the urea-formaldehyde resin powders, any method which can incorporate said agent uniformly in said powders can be used. However, in the case of directly applying the solution to a powdered urea-formaldehyde resin, a spraying method is most preferable.

Further, in the course of preparing a molding urea resin compound, a predetermined amount of water-solubilized macromolecular solution, as an antiagglomerating agent, may be added to a sirupy resin solution containing urea-formaldehyde precondensates, such as monomethylol urea, dimethylol urea and other condensates, and then the mixture may be made into a powdered urea-formaldehyde resin compound by a standard process.

DESCRIPTION OF THE PREFERRED EMBODIMENTS

The present invention shall now be explained with reference to the following illustrative examples.

Example 1

4 g. of PVAc-DBS solutions of respective concentrations as described below, were added by spraying to 150 g. samples of a powdered urea-formaldehyde resin prepared by the reaction of 1 mol of urea with 2.2 mols of formaldehyde using a hydrochloric acid catalyst. Each mixture was dried at 20° C. under a reduced pressure (2 mm. Hg) and was crushed to be of less than 80 mesh size. 100 g. of this powdered urea-formaldehyde resin were put into a beaker of a capacity of 300 ml. and were made to absorb moisture at 40° C. under 80% R.H. for 1 hour and then the penetration was measured with a penetrometer for 5 seconds. Separately, the weight of the residue after the powder was passed through a 10-mesh sieve was measured. The results are listed in Table 1.

TABLE 1

| Antiagglomerating agents | Concentration of antiagglomerating agent solution (percent by weight) | Amount of addition,[1] percent | Penetration,[2] mm. | Sieve residue,[3] grams |
| --- | --- | --- | --- | --- |
|  |  |  | 0 | 0.98 | 92 |
| PVAc-DBS [4] | 1.5 | 0.04 | 2.37 | 92 |
| PVAc-DBS [4] | 3.0 | 0.08 | 4.0 | 37 |
| PVAc-DBS [4] | 4.5 | 0.12 | 4.0 | 27 |
| PVAc-DBS [4] | 6.0 | 0.16 | 4.0 | 25 |
| PVAc-DBS [4] | 7.5 | 0.20 | 3.8 | 30 |
| DBS [5] | 4.5 | 0.12 | 1.0 | 90 |

[1] Amount of antiagglomerating agent added in g. (calculated as solids) to 100 g. of the powdered urea-formaldehyde resin.
[2] The higher the penetration, the higher the antiagglomerating effect.
[3] The less the residue on the sieve, the higher the antiagglomerating effect.
[4] PVAc (of a polymerization degree of 1,000) (grams)/DBS (grams) = 1/4.
[5] DBS: sodium dodecylbenzenesulfonate.

According to Table 1, when the antiagglomerating agent of the present invention is used, an excellent antiagglomerating effect is evident.

The powdered urea-formaldehyde resin subjected to the above-mentioned antiagglomerating treatment was heated and molded by a standard conventional process. Such various properties as the strength, hardness, electric properties, transparency and chemical resistance of the molded resin were practically substantially the same as those of similar resins which were not subjected to the antiagglomerating treatment.

Example 2

4 g. of each of the water-solubilized macromolecular solutions listed below (3.75% by weight solids in the aqueous solution and amount of the antiagglomerating agent, calculated as the solids, added being 0.1% of the weight the powdered urea-formaldehyde resin) were added by spraying to 150 g. samples of the same urea-formaldehyde resin as in Example 1 and the antiagglomerating effect was determined as described in Example 1. The results are listed in Table 2.

TABLE 2

| | Degree of polymerization of macromolecular compound | Penetration, mm. | Sieve residue, grams |
| --- | --- | --- | --- |
| Antiagglomerating agent: | | | |
| Maleic anhydride-vinyl acetate copolymer, SDS | 1,000 | 3.5 | 50 |
| PVF [1]-SDS | 800 | 3.9 | 41 |
| PVB [2]-SDS | 700 | 3.8 | 40 |
| 30% acetalized polyvinyl acetacetal, SDS | 1,400 | 3.4 | 45 |
| 50% saponified PVAc-SDS | 1,100 | 4.0 | 46 |
| SDS | | 1.5 | 85 |

[1] PVF = Polyvinyl formal.
[2] PVB = Polyvinyl butylal.

However, the weight ratio of the macromolecular compounds in g./the surface active agent in g. = 1/3.

As is evident from Table 2, the water-solubilized macromolecular shows an excellent antiagglomerating effect.

Example 3

0.1% (solids content) by weight of the antiagglomerating agents listed below (aqueous solution containing 5% by weight of the agent) of the present invention were added by spraying to 150 g. samples of a commercially available molding urea resin compound and antiagglomerating tests were made according to Example 1. The results are shown in Table 3.

TABLE 3

| | Penetration,[1] mm. | Sieve residue, grams |
| --- | --- | --- |
| Antiagglomerating agents: | | |
| Water-treatment | 0.9 | 96 |
| PVAc [2]-RS | 4.4 | 22 |
| PVAc-BNS | 3.5 | 45 |
| PVAc-OS | 4.0 | 40 |
| BNS | 1.0 | 80 |

[1] Macromolecular compound (grams)/surface active agent (grams) = 1/4.
[2] Polymerization degree of PVAc: 1,100.

As is evident from Table 3, by using the antiagglomerating agents of the present invention, an excellent antiagglomerating effect is obtained.

The embodiments of the invention in which an exclusive property or privilege is claimed are defined as follows:

1. A method of preventing the agglomeration of urea-formaldehyde resin powder, which comprises:
    applying to said resin an aqueous solution of a water-solubilized macromolecular vinylic compound as an antiagglomerating agent, said solution being obtained by dissolving in (1) an aqueous solution of an anionic surface active agent selected from the group consisting of surface active agents having carboxyl groups, alkyl sulphates, alkylaryl sulfonates and alkyl sulfonates, (2) a substantially water-insoluble macromolecular vinylic compound selected from the group consisting of water-insouble polyvinyl acetals, water-insoluble polyvinyl acetates, water-insoluble partially saponified polyvinyl acetates, water-insoluble partially acetylated polyvinyl alcohols, water-insoluble polymers obtained by the graft polymerization of vinyl acetate on polyvinyl alcohol, and water-insoluble copolymers of vinyl acetate with compounds copolymerizable therewith, the combined amounts of said water-insoluble macromolecular vinylic compound and said surface active agent added to said resin being from about 0.005 to 2.0% by weight of the resin powder, and
    drying said resin powder to remove water, whereby to produce a dried resin powder having improved nonagglomerating characteristics.

2. The method according to claim 1, in which the mixing ratio of the water-insoluble macromolecular vinylic compound and the anionic surface active agent is from 10:100 to 100:10, parts by weight.

3. The method according to claim 1, in which said aqueous solution is applied to said resin by spraying.

4. The method according to claim 1, in which said powdered urea-formaldehyde resin is a molding urea resin compound.

5. The method according to claim 1, in which the concentration of the anionic surface active agent in said aqueous solution is from about 10% to about 30% by weight.

6. The method according to claim 1, in which the combined amounts of said water-insoluble macromolecular vinylic compound and said surface active agent added to said resin is from about 0.05–0.5% by weight of the resin powder.

7. A moldable plastic material, comprising discrete particles of urea-formaldehyde resin coated with from 0.005 to 2.0% by weight, based on the weight of the resin, of dry anti-agglomerating agent consisting of an anionic surface active agent and a macromolecular vinylic compound, the anionic surface active agent being selected from the group consisting of surface active agents having carboxyl groups, alkyl sulphates, alkylaryl sulfonates and alkyl sulfonates, the macromolecular vinylic compound being selected from the group consisting of water-insoluble polyvinyl acetals, water-insoluble polyvinyl acetates, water-insoluble partially saponified polyvinyl acetates, water-insoluble partially acetylated polyvinyl alcohols, water-insoluble polymers obtained by the graft polymerization of vinyl acetate on polyvinyl alcohol and water-insoluble copolymers of vinyl acetate with compounds copolymerizable therewith, the ratio of said macromolecular vinylic compound to said anionic surface active agent in said anti-agglomerating agent being from 10:100 to 100:10 parts by weight.

8. A moldable plastic material according to claim 7 in which the urea-formaldehyde resin particles are coated with from about 0.05 to 0.5% by weight of the anti-agglomerating agent.

References Cited

UNITED STATES PATENTS

| | | | |
|---|---|---|---|
| 2,905,532 | 9/1959 | Thompson | 252—385 |
| 3,143,410 | 8/1964 | Smith | 252—385 |
| 3,190,763 | 6/1965 | Schleede et al. | 106—186 |
| 3,329,637 | 7/1967 | Vitalis | 260—851 |
| 3,384,622 | 5/1968 | Sheers | 260—851 |
| 3,388,990 | 6/1968 | Maruta et al. | 252—382 |
| 3,428,579 | 2/1969 | Stahnecker et al. | 117—100 |

DONALD E. CZAJA, Primary Examiner

R. W. GRIFFIN, Assistant Examiner

U.S. Cl. X.R.

252—382, 384; 260—851